United States Patent
Liao

(10) Patent No.: US 9,649,557 B2
(45) Date of Patent: May 16, 2017

(54) METHOD AND TERMINAL FOR GAME DATA COMMUNICATION

(71) Applicant: Tencent Technology (Shenzhen) Company Limited, Shenzhen (CN)

(72) Inventor: Haizhen Liao, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 441 days.

(21) Appl. No.: 14/265,274

(22) Filed: Apr. 29, 2014

(65) Prior Publication Data

US 2014/0235357 A1    Aug. 21, 2014

Related U.S. Application Data

(63) Continuation of application No. PCT/CN2013/090750, filed on Dec. 27, 2013.

(30) Foreign Application Priority Data

Dec. 28, 2012  (CN) .......................... 2012 1 0584776

(51) Int. Cl.
*G06F 15/16* (2006.01)
*A63F 13/30* (2014.01)
(Continued)

(52) U.S. Cl.
CPC ............ *A63F 13/12* (2013.01); *A63F 13/327* (2014.09); *A63F 13/34* (2014.09); *A63F 13/77* (2014.09);
(Continued)

(58) Field of Classification Search
CPC .................. H04L 29/08306–29/08387; H04W 84/18–84/22; A63F 13/31–13/34
See application file for complete search history.

(56) References Cited

U.S. PATENT DOCUMENTS 6,396,170 B1 * 5/2002 Laufenberg ............. H02J 9/062
307/43
7,174,364 B1 * 2/2007 Aravamudan .... G06F 17/30873
707/E17.111
(Continued)

FOREIGN PATENT DOCUMENTS

CN        1531270 A     9/2004
CN      102761853 A    10/2012
(Continued)

OTHER PUBLICATIONS

Tencent Technology, ISRWO, PCT/CN2013/090750, Apr. 3, 2014, 6 pgs.

(Continued)

*Primary Examiner* — Brendan Higa
(74) *Attorney, Agent, or Firm* — Morgan, Lewis & Bockius LLP

(57) ABSTRACT

A method for controlling game data communication between portable electronic devices includes receiving one or more performance parameters from multiple portable electronic devices as slave devices. The method also includes determining whether the portable electronic device satisfies performance criteria with respect to the multiple portable electronic devices. The method further includes, in accordance with a determination that the portable electronic device does not satisfy the performance criteria with respect to the multiple portable electronic devices: selecting one of the multiple portable electronic devices as a new master device; and transferring a master device status to the selected portable electronic device. The method includes, subsequent to transferring a master device status to the selected portable electronic device, communicating, as a slave device, with the selected portable electronic device.

14 Claims, 7 Drawing Sheets

(51) Int. Cl.
  *H04L 29/08*    (2006.01)
  *A63F 13/34*    (2014.01)
  *A63F 13/327*   (2014.01)
  *A63F 13/77*    (2014.01)
  *H04W 84/20*    (2009.01)
(52) U.S. Cl.
  CPC ....... *H04L 29/08351* (2013.01); *H04W 84/20* (2013.01)

(56) References Cited

U.S. PATENT DOCUMENTS

| | | | |
|---|---|---|---|
| 7,177,951 B1* | 2/2007 | Dykeman | H04L 61/6004 709/238 |
| 7,197,660 B1* | 3/2007 | Liu | G06F 11/2035 714/4.12 |
| 2011/0009107 A1* | 1/2011 | Guba | G08G 1/20 455/418 |
| 2012/0233266 A1* | 9/2012 | Hassan | H04W 4/08 709/206 |
| 2014/0293852 A1* | 10/2014 | Watanabe | H04W 52/0277 370/311 |

FOREIGN PATENT DOCUMENTS

| | | |
|---|---|---|
| TW | 201215175 A | 4/2012 |
| TW | 201218839 A | 5/2012 |

OTHER PUBLICATIONS

Tencent Technology, IPRP, PCT/CN2013/090750, Jun. 30, 2015, 4 pgs.

\* cited by examiner

700

702 Receive one or more performance parameters from multiple portable electronic devices as slave devices 704 The one or more performance parameters include one or more of an energy level of a respective portable electronic device and a usage rate of a processor of the respective portable electronic device 706 Determine whether the portable electronic device satisfies performance criteria with respect to the multiple portable electronic devices 708 Determining whether the portable electronic device satisfies the performance criteria includes: identifying a subset of the multiple portable electronic devices that exceed a threshold energy level; and determining whether the portable electronic device is within a predefined percentage of the subset of portable electronic devices in accordance with the usage rate of a processor for a predefined number of successive cycles In accordance with a determination that the portable electronic device does not satisfy the performance criteria with respect to the multiple portable electronic devices 710 Select one of the multiple portable electronic devices as a new master device 712 Transfer a master device status to the selected portable electronic device 714 Transferring the master device status to the selected portable electronic devices includes sending, to portable electronic devices connected as slave devices to the portable electronic device, a broadcast message indicating that the selected portable electronic device is a new master device

Fig. 7A

716 Subsequent to transferring a master device status to the selected portable electronic device, communicate, as a slave device, with the selected portable electronic device

718 Communicating, as a slave device, with the selected portable electronic device includes sending one or more performance parameters of the portable electronic device to the selected portable electronic device

720 Receive a resource request from a first slave device. In response to receiving the resource request, send a broadcast message to one or more slave devices, connected to the portable electronic device as slave devices, other than the first slave device. In response to sending the broadcast message, receive one or more responses from the one or more slave devices. Select a slave device in accordance with predefined criteria. Sending information identifying the selected slave device to the first slave device.

722 Selecting the slave device in accordance with the predefined criteria includes: selecting a subset of the one or more slave devices, connected to the portable electronic device as slave devices, that have a resource requested in the resource request, and selecting a slave device, of the subset of the one or more slave devices, based on one or more performance parameters of the slave device.

Fig. 7B

METHOD AND TERMINAL FOR GAME DATA COMMUNICATION

RELATED APPLICATIONS

This application is a continuation application of PCT Patent Application No. PCT/CN2013/090750, entitled "METHOD AND TERMINAL FOR GAME DATA COMMUNICATION" filed Dec. 27, 2013, which claims priority to Chinese Patent Application No. 201210584776.3, "METHOD AND TERMINAL FOR GAME DATA COMMUNICATION," filed Dec. 28, 2012, both of which are hereby incorporated by reference in their entirety.

TECHNICAL FIELD

This application relates to computer communications, in particular to communication of game data.

BACKGROUND

Multi-player games, such as card games and mahjong, typically need many users to play the same game together. Users can use mobile phones to participate in the multi-player game through cellular communication networks, such as 2G and 3G networks.

However, with the existing technology, it is important that all users participating in the multi-player game have access to a cellular communication network, such as a 2G or 3G network. If the signal quality of the cellular communication network is low, or if a user does not have access to the cellular communication network, then the multi-player game cannot be played.

SUMMARY

The above deficiencies and other problems associated with the conventional approach of communication between different players are reduced or eliminated by the invention disclosed below. In some embodiments, the invention is implemented in a computer system that has one or more processors, memory and one or more modules, programs or sets of instructions stored in the memory for performing multiple functions. Instructions for performing these functions may be included in a computer program product configured for execution by one or more processors.

One aspect of the present application involves a computer-implemented method performed by a portable electronic device for controlling game data communication between portable electronic devices. The computer-implemented method includes: receiving one or more performance parameters from multiple portable electronic devices as slave devices; determining whether the portable electronic device satisfies performance criteria with respect to the multiple portable electronic devices; in accordance with a determination that the portable electronic device does not satisfy the performance criteria with respect to the multiple portable electronic devices: selecting one of the multiple portable electronic devices as a new master device; and transferring a master device status to the selected portable electronic device; and, subsequent to transferring a master device status to the selected portable electronic device, communicating, as a slave device, with the selected portable electronic device.

Another aspect of the invention involves a portable electronic device for controlling game data communication with portable electronic devices. The portable electronic device includes memory, one or more processors, and one or more programs stored in the memory and configured for execution by the one or more processors. The one or more programs include instructions for: receiving one or more performance parameters from multiple portable electronic devices as slave devices; determining whether the portable electronic device satisfies performance criteria with respect to the multiple portable electronic devices; in accordance with a determination that the portable electronic device does not satisfy the performance criteria with respect to the multiple portable electronic devices: selecting one of the multiple portable electronic devices as a new master device; and transferring a master device status to the selected portable electronic device; and, subsequent to transferring a master device status to the selected portable electronic device, communicating, as a slave device, with the selected portable electronic device.

Another aspect of the invention involves a non-transitory computer readable storage medium having stored therein one or more programs for execution by one or more processors of a portable electronic device, the one or more programs including instructions for: receiving one or more performance parameters from multiple portable electronic devices as slave devices; determining whether the portable electronic device satisfies performance criteria with respect to the multiple portable electronic devices; in accordance with a determination that the portable electronic device does not satisfy the performance criteria with respect to the multiple portable electronic devices: selecting one of the multiple portable electronic devices as a new master device; and transferring a master device status to the selected portable electronic device; and, subsequent to transferring a master device status to the selected portable electronic device, communicating, as a slave device, with the selected portable electronic device.

BRIEF DESCRIPTION OF THE DRAWINGS

The aforementioned features and advantages of the embodiments as well as additional features and advantages thereof will be more clearly understood when considered in conjunction with the drawings.

The following briefly describes the drawings of this application. The drawings illustrate only some of the embodiments.

FIGS. 7A-7B illustrate a flow chart of an exemplary method for controlling game data communication between portable electronic devices in accordance with some embodiments.

Like reference numerals refer to corresponding parts throughout the several views of the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

The embodiments are described in detail below in combination with the attached drawings. Obviously, the embodiments herein describe only certain embodiments and not all possible embodiments. However, based on the embodiments described herein, a person having ordinary skill in the art would understand that variations of these embodiments are possible.

Some of the embodiments include methods that enable multi-player game realize in the environment of a communication network. A terminal used by each user who participates in the same multi-player game has been configured to make a direct wireless connection using a WIFI-Direct module. Each user carries out data communication through the WIFI-Direct module of the terminal he/she uses. The WIFI-Direct modules of different terminals adopt WIFI-Direct technology to conduct data communication.

In some embodiments, control terminal, candidate terminal and controlled terminal are terminals configured to include a WIFI-Direct module. When a user uses a terminal to initiate a multi-player game, the terminal that the user uses is called the control terminal. Other users can initiate participation in the multi-player game by using their own terminals, and the terminals used by each of other users are called candidate terminals. The control terminal selects one or more user terminals from the candidate terminals, and the one or more selected user terminals participate in the multi-player game together with control terminal. In some embodiments, the multi-player game is the game which has at least two terminals participate.

Figure 1:
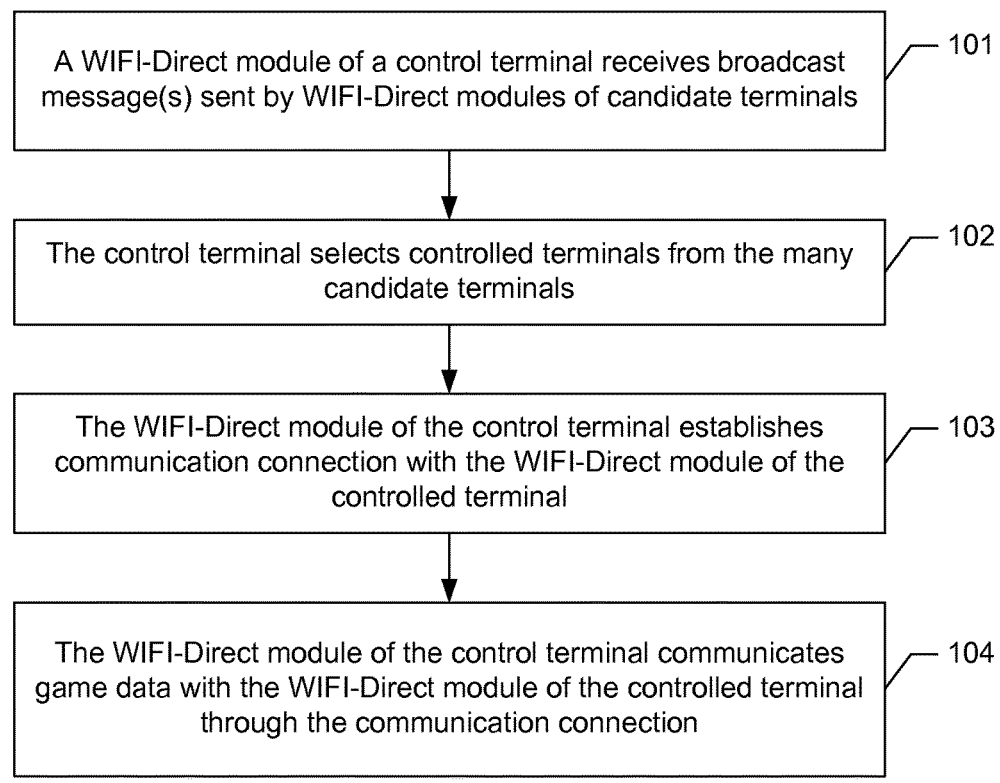
FIG. 1 is a flowchart diagram of a game data communication method in accordance with some embodiments.

FIG. 1 illustrates a method for game data communication in accordance with some embodiments.

In operation 101, a WIFI-Direct module of a control terminal receives one or more broadcast messages sent by WIFI-Direct modules of candidate terminals.

A respective broadcast message of the one or more broadcast messages includes an indication of a corresponding candidate terminal. The WIFI-Direct module is used to conduct data communication (e.g., by using WIFI-Direct technology).

In some embodiments, the WIFI-Direct module of the control terminal remains in a close state to reduce the power consumption of the control terminal until a user launches the WIFI-Direct module of the control terminal manually. Alternatively, when the user launches a multi-player game application, the multi-player game application automatically starts the WIFI-Direct module of the control terminal.

It is important to note that, either the WIFI-Direct module of the control terminal, or the WIFI-Direct module of a candidate terminal, after WIFI-Direct module starting up, sends out broadcast messages periodically. This allows other terminals with WIFI-Direct modules to receive the broadcast messages, and recognize the presence of terminals with WIFI-Direct Modules.

In operation 102, the control terminal selects controlled terminals from the candidate terminals.

For example, in some embodiments, the control terminal selects the controlled terminals according to a number of people required by a multi-player game and other conditions.

In operation 103, the WIFI-Direct module of the control terminal establishes communication connection with the WIFI-Direct module of the controlled terminal.

For example, the WIFI-Direct module of the control terminal sends, to the WIFI-Direct module of the controlled terminal, a request for establishing communication connection. After receiving the request for establishing communication connection, the controlled terminal sends a confirmation to the WIFI-Direct module of the control terminal, indicating that the controlled terminal is available to establish communication connection with the control terminal, or a rejection indicating that the controlled terminal is unavailable to establish communication connection with the control terminal.

When the WIFI-Direct module of the control terminal receives the confirmation from the controlled terminal, the WIFI-Direct module of the control terminal shows that the WIFI-Direct module of the control terminal has successfully established communication connection with the WIFI-Direct module of the controlled terminal.

In operation 104, the WIFI-Direct module of the control terminal communicates game data with the WIFI-Direct module of the controlled terminal through the established communication connection.

In some embodiments, when the control terminal communicates game data to the controlled terminals, the control terminal communicates game data to different controlled terminals using different data transmission methods (e.g., synchronous transmission or asynchronous transmission).

For example, the control terminal transmits synchronous data (e.g., data that needs to be displayed synchronously in the controlled terminal, a message sent into group chat by the control terminal, or a game operation that needs be shown synchronously in the controlled terminal) to each controlled terminal.

In another example, the control terminal transmits asynchronous data (e.g., data, distributed only to a single controlled terminal by the control terminal, which needs to be shown in the single controlled terminal and not in other controlled terminals) only to the single controlled terminal.

FIG. 1 refers to the control terminal and the controlled terminal as an example to describe how communication connections are established between the two terminals set with WIFI-Direct modules. However, a person having skilled in the art would understand that similar operations can be performed between any two terminals. For brevity, these details are omitted.

As described above, the WIFI-Direct module of the control terminal can establish communication connection with the WIFI-Direct module of the controlled terminal, and communicate game data with the WIFI-Direct module of the controlled terminal through the communication connection. Because WIFI-Direct modules uses WIFI-Direct technology to conduct data communication between them, cellular communication networks, such 2G or 3G networks, are not needed to enable data communications among many terminals with WIFI-Direct modules. Thus, each terminal participating in the same multi-player game can communicate game data through WIFI-Direct modules, even if each terminal cannot communicate game through cellular networks, such as 2G or 3G networks, using the conventional technology. Thus, the described embodiments compliment a multi-player game using a cellular communication network, such as a 2G or 3G network In some embodiments, if the number of the controlled terminals is great than or equal to two, control terminals are dynamically switched. This allows balancing the load of each terminal participating in the same multi-player game. This also avoids an interruption of multi-player game due to overloading of a single control terminal.

Figure 2:
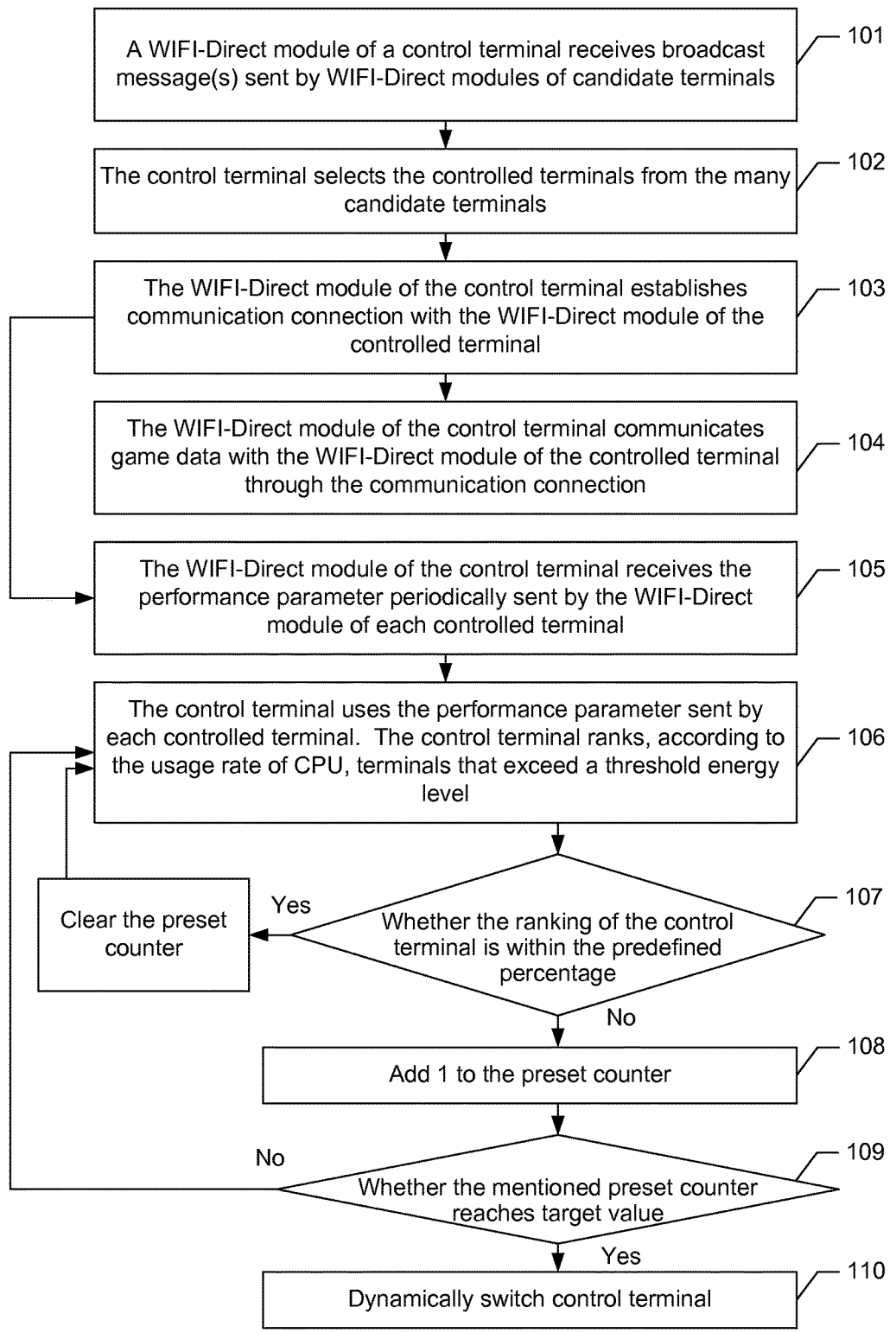
FIG. 2 is another flowchart diagram of a game data communication method in accordance with some embodiments.

FIG. 2 illustrates another method for game data communication in accordance with some embodiments. FIG. 2 includes operations 101, 102, 103, and 104 described above with respect to FIG. 1.

FIG. 2 also illustrates that, after the aforementioned operation 103, operation 105 is performed. In operation 105, the WIFI-Direct module of the control terminal receives one or more performance parameters periodically sent by the WIFI-Direct module of each controlled terminal. The one or more performance parameters include one or more of an energy level (e.g., a battery charge level) of the controlled terminal and a usage rate of CPU (central processing unit or a processor) of the controlled terminal.

For example, in some embodiments, each controlled terminal periodically (for example, every five seconds) sends the energy level and the usage rate of CPU.

In operation 106, the control terminal uses the performance parameter sent by each controlled terminal. In some embodiments, the control terminal ranks, according to the usage rate of CPU, terminals that exceed a threshold energy level.

For example, in some embodiments, the threshold energy level is 10% (or 20%). For example, only controlled terminals that have energy levels that exceed 10% (or 20%) are ranked by the control terminal.

In some embodiments, a terminal that has a lowest usage rate of CPU is ranked at the top.

In operation 107, the control terminal determines whether the control terminal is within a predefined percentage of the terminals in the ranking.

For example, in some embodiments, the predefined percentage is 50%. In such embodiments, the control terminal determines whether the control terminal is ranked among the top 50% of the terminals.

In operation 108, in accordance with a determination that the control terminal is not within the predefined percentage, the control terminal adds 1 to the preset counter. Otherwise, in accordance with a determination that the control terminal is within the predefined percentage, the control terminal clears the preset counter (e.g., the preset counter is set to zero), and repeats operation 106 using a subsequent set of performance parameters sent by each controlled terminal.

In operation 109, the control terminal determines whether the preset counter has reached a predefined value.

In operation 110, in accordance with a determination that the preset counter has reached the predefined value, the control terminal initiates dynamic switching of the control terminal. Otherwise, in accordance with a determination that the preset counter has not reached the predefined value, the control terminal repeats operation 106 using a subsequent set of performance parameters.

In some embodiments, the predefined value is three. For example, in accordance with a determination that the control terminal is not within the predefined percentage for successive three periods, the control terminal initiates dynamic switching of the control terminal.

In some embodiments, the target value is set to avoid excessive dynamic switching of the control terminal, which adversely affects the experience of users.

In some embodiments, the dynamic switching of the control terminal includes the following operations.

In accordance with a determination that the preset counter has reached the predefined value, the control terminal selects a highest ranked terminal as a new control terminal, and sends a broadcast message to each controlled terminal to notify the identification of the new control terminal. After that, the control terminal becomes a controlled terminal.

In some embodiments, in operation 104, controlled terminals send signaling (for example, a resource request) to the control terminal. In some embodiments, two controlled terminals conduct point-to-point data transmission between each other.

Figure 3:
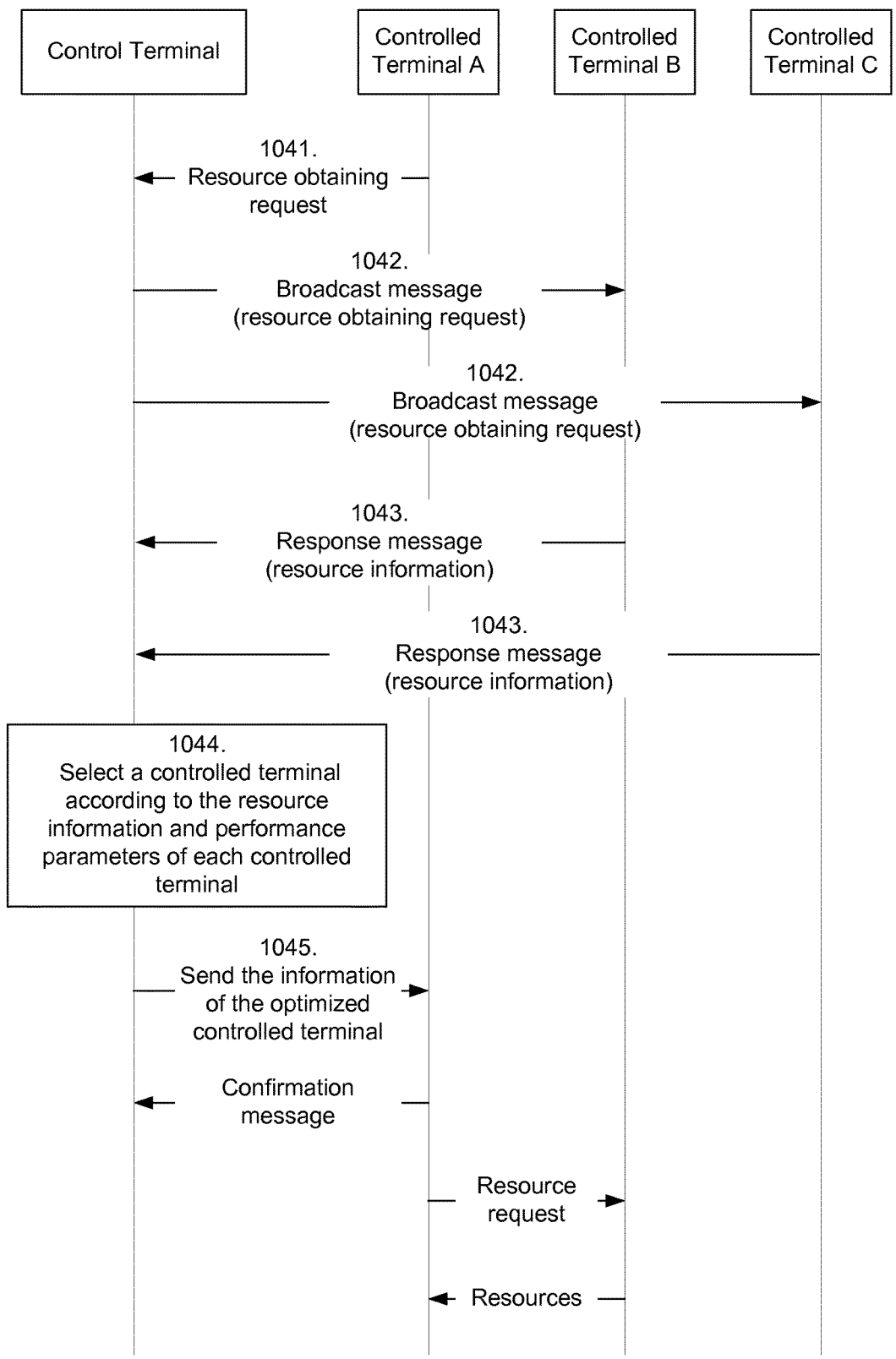
FIG. 3 is yet another flowchart diagram of a game data communication method in accordance with some embodiments.

FIG. 3 illustrates details of operation 104 in accordance with some embodiments.

In operation 1041, the WIFI-Direct module of the control terminal receives the resource obtaining request from the WIFI-Direct module of a controlled terminal (called herein a target controlled terminal with respect to FIG. 3) through the communication connection.

For example, in FIG. 3, the controlled terminal A is a target controlled terminal. The controlled terminal A needs an installation file (or upgrade file) of a plug-in package of a multi-player game. The WIFI-Direct module of the controlled terminal A sends, to the control terminal, a request for resource to obtain the installation file (or upgrade file) of a plug-in package.

In response, in operation 1042, the WIFI-Direct module of the control terminal sends a broadcast message that includes the resource request.

For example, in FIG. 3, the WIFI-Direct module of the control terminal sends a broadcast message to the WIFI-Direct module of the controlled module B and the WIFI-Direct module of the controlled terminal C.

In operation 1043, the WIFI-Direct module of the control terminal receives the response message from each controlled terminal that received the broadcast message. The response message includes resource information of the controlled terminal.

For example, in FIG. 3, the WIFI-Direct module of the controlled terminal B and the WIFI-Direct module of the controlled terminal C send respective response messages to the WIFI-Direct module of the control terminal.

In operation 1044, the control terminal selects a controlled terminal according to the resource information and performance parameters of each controlled terminal. The selected controlled terminal stores the requested resource and has performance parameters to satisfy the resource request.

For example, after receiving the resource information of the controlled terminal B and the controlled terminal C, the control terminal determines that both the controlled terminal B and the controlled terminal C store the resource requested by the controlled terminal A. The control terminal further compares the performance parameters of the controlled terminal B and the controlled terminal C, and selects a controlled terminal based on the energy level and/or the usage rate of CPU of the controlled terminal. For example, the control terminal selects a controlled terminal that has a high energy level, or a controlled terminal that has a low usage rate of CPU.

In operation 1045, the WIFI-Direct module of the control terminal sends the information of the selected controlled terminal (e.g., information identifying the selected controlled terminal) to the target controlled terminal. This enables the target controlled terminal to obtain the required resource from the selected controlled terminal.

For example, in FIG. 3, the selected controlled terminal is the controlled terminal B. The control terminal sends the information of the controlled terminal B to the controlled terminal A. After receiving the information of the selected controlled terminal, the controlled terminal A sends an acknowledgement to the control terminal. This indicates to the control terminal that the controlled terminal A has successfully received the information of the selected controlled terminal. After that, the controlled terminal A and the controlled terminal B directly conduct the point-to-point transmission of the requested resource.

Figure 4:
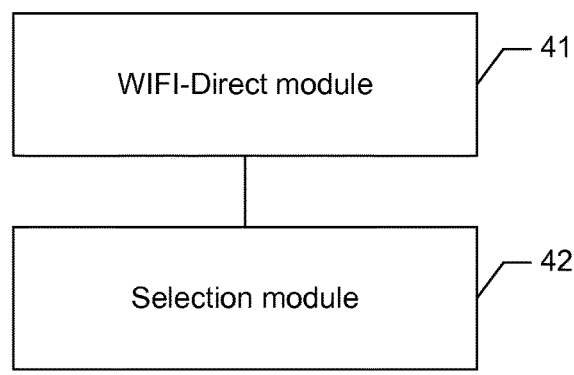
FIG. 4 is a structural diagram of a terminal in accordance with some embodiments.

FIG. 4 illustrates a structural diagram of a terminal in accordance with some embodiments.

The terminal includes a WIFI-Direct module 41. The WIFI-Direct module 41 is configured to receive broadcast messages sent by WIFI-Direct modules of other terminals. In some embodiments, the broadcast messages include one or more identifications of candidate terminals. In some embodiments, the WIFI-Direct module uses WIFI-Direct technology to conduct data communication.

The terminal also includes a selection module 42. The selection module 42 is configured to select controlled terminals from candidate terminals.

The WIFI-Direct module 41 is also configured to establish communication connection with the WIFI-Direct module of other terminals (e.g., controlled terminals).

The WIFI-Direct module 41 is also configured to communicate game data with the WIFI-Direct module of a controlled terminal through the communication connection.

As described above, the WIFI-Direct module of the control terminal can establish communication connection with the WIFI-Direct module of the controlled terminal, and communicate game data with the WIFI-Direct module of the controlled terminal through the communication connection. Because WIFI-Direct modules uses WIFI-Direct technology to conduct data communication between them, cellular communication networks, such 2G or 3G networks, are not needed to enable data communications among many terminals with WIFI-Direct modules. Thus, each terminal participating in the same multi-player game can communicate game data through WIFI-Direct modules, even if each terminal cannot communicate game through cellular networks, such as 2G or 3G networks, using the conventional technology. Thus, the described embodiments compliment a multi-player game using a cellular communication network, such as a 2G or 3G network In some embodiments, the terminal shown in FIG. 4 performs the method shown in FIG. 1.

In some embodiments, the terminal is a control terminal. In some embodiments, if the number of the controlled terminals is great than or equal to two, control terminals are dynamically switched. This allows balancing the load of each terminal participating in the same multi-player game. This also avoids an interruption of multi-player game due to overloading of a single control terminal.

The WIFI-Direct module 41 is also configured to receive one or more performance parameters periodically sent by the WIFI-Direct module of each controlled terminal. The one or more performance parameters include one or more of: a percentage of an energy level of the controlled terminal and a usage rate of CPU of the controlled terminal.

Figure 5:
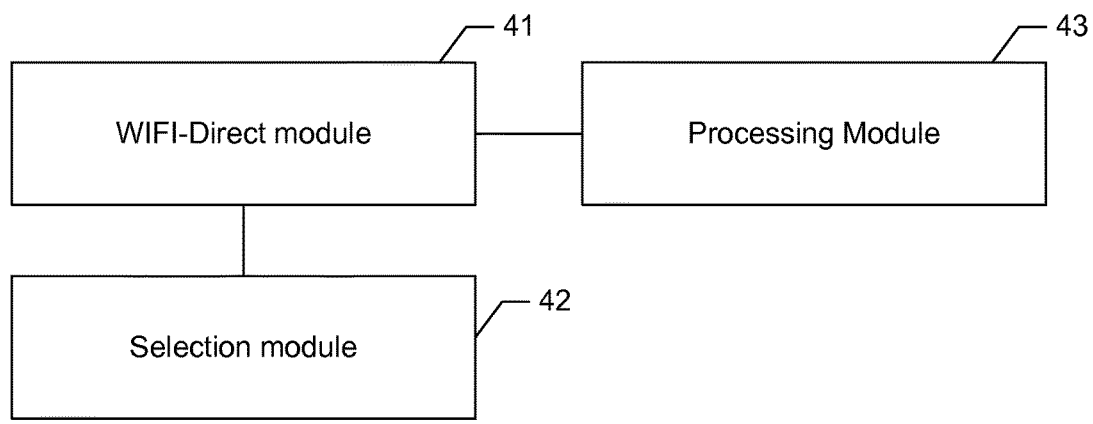
FIG. 5 is another structural diagram of a terminal in accordance with some embodiments.

FIG. 5 illustrates another structural diagram of a terminal in accordance with some embodiments.

The terminal illustrated in FIG. 5 includes the WIFI-Direct module 41 and the selection module 42 described above with respect to FIG. 4.

The terminal also includes a processing module 43. The processing module 43 is configured to use performance parameters sent by each controlled terminal. The processing module 43, according to the usage rate of CPU, ranks the control terminal and controlled terminals that exceed a threshold energy level.

The processing module 43 is also configured to determine whether the control terminal is within a predefined percentage of terminals (e.g., in terms of the energy level and/or the usage rate of CPU).

The processing module 43 is configured to increase the preset counter in accordance with a determination that the control terminal is not within the predefined percentage of terminals. The processing module 43 is also configured to clear the preset counter in accordance with a determination that the control terminal is within the predefined percentage of terminals.

The processing module 43 is also configured to initiate dynamic switching of the control terminal in accordance with a determination that the preset counter has reached a predefined value. The processing module 43 is also configured to forego initiating the dynamic switching of the control terminal in accordance with a determination that the preset counter has not reached a predefined value.

Furthermore, the processing module 43 is configured to select a controlled terminal based on the ranking of the terminals, and send a broadcast message to each controlled terminal to notify the controlled terminals of the identification of the selected controlled terminal as a new control terminal.

In some embodiments, the terminal shown in the FIG. 5 performs the method shown in FIG. 2.

In some embodiments, the WIFI-Direct module 41 is also configured to receive a resource request from the WIFI-Direct module of a target controlled terminal. The WIFI-Direct module 41 is further configured to send broadcast messages, and the broadcast message includes the resource request. The WIFI-Direct module 41 is configured to receive responses sent by respective controlled terminals. A response from a respective controlled terminal includes the resource information of the respective controlled terminal.

In some embodiments, selection module 42 is configured to select a controlled terminal based on the resource information and one or more performance parameters of each controlled terminal. The selected controlled terminal stores the requested resource. In some embodiments, the selected controlled terminal has a performance to satisfy the resource request.

In some embodiments, the WIFI-Direct module 41 is configured to send the information of the selected controlled terminal to the target controlled terminal. This enables the target controlled terminal to obtain the required resource directly from the selected controlled terminal.

In some embodiments, the WIFI-Direct module 41 performs one or more operations of the control terminal shown in FIG. 3.

Figure 6:
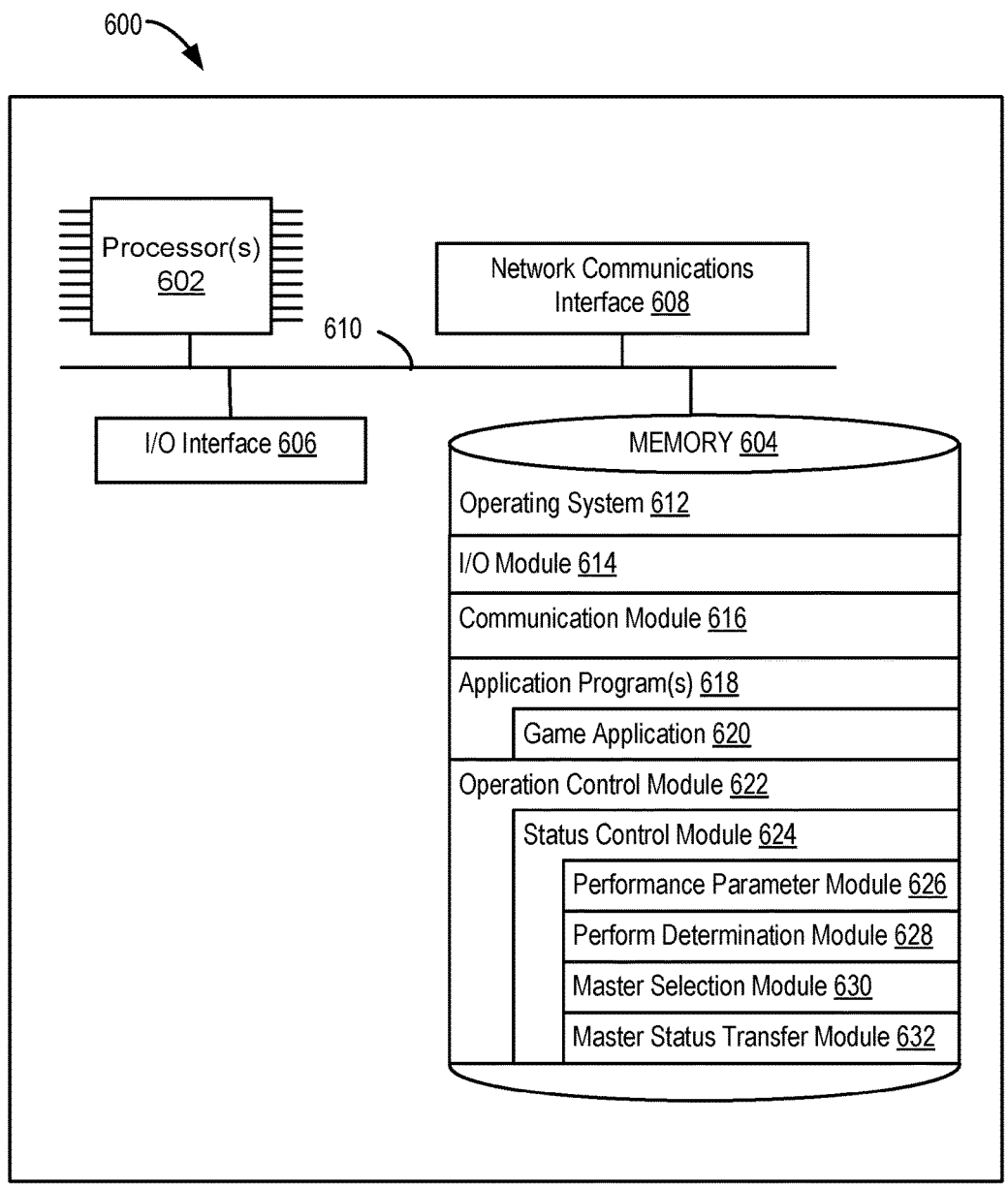
FIG. 6 is a block diagram of a computer system in accordance with some embodiments.

FIG. 6 is a block diagram of a computer system 600 for implementing the method of for controlling game data communication between portable electronic devices in accordance with some embodiments. In some embodiments, the system 600 comprises a portable electronic device (e.g., mobile device, handheld computer, tablet computer, etc.).

As shown in FIG. 6, the system 600 includes one or more processing units (also called herein "processors") 602, memory 604, an input/output (I/O) interface 606, and a network communications interface 608. These components communicate with one another over one or more communication buses or signal lines 610. In some embodiments, the memory 604, or the computer readable storage media of memory 604, stores programs, modules, instructions, and data structures including all or a subset of: an operating system 612, an I/O module 614, a communication module 616, one or more application programs 618, and an operation control module 622. The one or more processors 602 are coupled to the memory 604 and operable to execute these programs, modules, and instructions, and reads/writes from/ to the data structures.

In some embodiments, the processing units 602 include one or more microprocessors, such as a single core or multi-core microprocessor. In some embodiments, the processing units 602 include one or more general purpose processors. In some embodiments, the processing units 602 include one or more special purpose processors.

In some embodiments, the memory 604 includes high-speed random access memory, such as DRAM, SRAM, DDR RAM or other random access solid state memory devices. In some embodiments the memory 604 includes non-volatile memory, such as one or more magnetic disk storage devices, optical disk storage devices, flash memory devices, or other non-volatile solid state storage devices. In some embodiments, the memory 604 includes one or more storage devices remotely located from the processing units 602. The memory 604, or alternately the non-volatile memory device(s) within the memory 604, comprises a computer readable storage medium. In some embodiments, the memory 604 comprises a non-transitory computer readable storage medium.

In some embodiments, the I/O interface 606 couples one or more input/output devices, such as one or more displays (e.g., a touch-sensitive display, also called a touch screen), a keyboards, touch screens, speakers, and microphones, to the I/O module 614 of the system 600. The I/O interface 606, in conjunction with the I/O module 614, receive user inputs (e.g., voice input, keyboard inputs, touch inputs, etc.) and process them accordingly. The I/O interface 606 and the I/O module 614 also present outputs (e.g., sounds, images, text, etc.) to the user according to various program instructions implemented on the system 600.

In some embodiments, the network communications interface 608 includes wired communication port(s) and/or wireless transmission and reception circuitry. The wired communication port(s) receive and send communication signals via one or more wired interfaces, e.g., Ethernet, Universal Serial Bus (USB), FIREWIRE, etc. The wireless circuitry receives and sends RF signals and/or optical signals from/to communications networks and other communications devices. The wireless communications may use any of a plurality of communications standards, protocols and technologies, such as GSM, EDGE, CDMA, TDMA, Bluetooth, WiFi, VoIP, Wi-MAX, or any other suitable communication protocol. The network communications interface 608 enables communication between the system 600 with networks, such as the Internet, an intranet and/or a wireless network, such as a cellular telephone network, a wireless local area network (LAN) and/or a metropolitan area network (MAN), and other devices. The communications module 616 facilitates communications between the system 600 and other devices (e.g., the first client device and the second client device) over the network communications interface 608.

In some embodiments, the operating system 602 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communications between various hardware, firmware, and software components.

In some embodiments, the system 600 is implemented on a portable electronic device (e.g., a smart phone, a mobile phone, a tablet computer, etc.). It should be noted that the system 600 is only one example, and that the system 600 may have more or fewer components than shown, may combine two or more components, or may have a different configuration or arrangement of the components. The various components shown in FIG. 6 may be implemented in hardware, software, firmware, including one or more signal processing and/or application specific integrated circuits, or a combination of thereof.

In FIG. 6, the one or more application programs 618 stored in the memory 604 include one or more game applications 620.

As shown in FIG. 6, in some embodiments, the operation control module 622 includes a status control module 624, which includes the followings modules, or a subset or superset thereof: a performance parameter module 626, a performance determination module 628, a master selection module 630, and a master status transfer module 632.

In some embodiments, the performance parameter module 626 is configured to receive one or more performance parameters from other portable electronic devices.

In some embodiments, the performance determination module 628 is configured to determine whether the computer system (e.g., the portable electronic device) satisfies performance criteria with respect to the portable electronic devices.

In some embodiments, the master selection module 630 is configured to select one of the portable electronic devices.

In some embodiments, the master status transfer module 632 is configured to transfer a master device status.

Details of the structures, functions, and interactions of these modules are provided with respect to FIGS. 1-5 and 7A-7B and accompanying descriptions.

FIGS. 7A-7B illustrate a flow chart of an exemplary method 700 for controlling game data communication between portable electronic devices in accordance with some embodiments. The method is performed by a portable electronic device (e.g., the portable electronic device 700 illustrated in FIG. 6) with memory and one or more processors.

In some embodiments, the portable electronic device is a master device (also called herein a control device) that controls communications among multiple portable electronic devices (typically three or more portable electronic devices). In some embodiments, remaining portable electronic devices of the multiple portable electronic devices (e.g., portable electronic devices other than the master device) are also called herein slave devices or controlled terminals.

The portable electronic device receives (702) one or more performance parameters from multiple portable electronic devices as slave devices.

In some embodiments, the one or more performance parameters include (704) one or more of an energy level of a respective portable electronic device and a usage rate of a processor of the respective portable electronic device. In some embodiments, the one or more performance parameters include an energy level of a respective portable electronic device. In some embodiments, the one or more performance parameters include a usage rate of a processor of the respective portable electronic device. In some embodiments, the one or more performance parameters include both the energy level of the respective portable electronic device and the usage rate of a processor of the respective portable electronic device. In some embodiments, the respective portable electronic device includes a plurality of processors, and the usage rate of a processor of the respective portable electronic device corresponds to a representative usage rate of the plurality of processors of the respective portable electronic device (e.g., an average of usage rates of the plurality of processors).

The portable electronic device determines (706) whether the portable electronic device satisfies performance criteria with respect to the multiple portable electronic devices. For example, in some embodiments, the portable electronic device determines whether the portable electronic device has a usage rate of a processor that meets predefined performance criteria (e.g., less than 60%).

In some embodiments, determining whether the portable electronic device satisfies the performance criteria includes (708) identifying a subset of the multiple portable electronic devices that exceed a threshold energy level, and determining whether the portable electronic device is within a predefined percentage of the subset of portable electronic devices in accordance with the usage rate of a processor for a predefined number of successive cycles. For example, in some embodiments, the portable electronic device identifies that, out of ten portable electronic devices, eight portable electronic devices exceed the threshold energy level (e.g., the eight portable electronic devices have 20% or higher energy level). In some embodiments, the portable electronic device determines that the portable electronic device is ranked the third among the eight portable electronic devices in terms of the usage rate of a processor, and that the ranking of the portable electronic device meets predefined criteria (e.g., less than 50% of the eight portable electronic devices). In some embodiments, the portable electronic device receives the one or more performance parameters over multiple cycles (e.g., three), each cycle apart from a preceding cycle by at least a predefined interval, and determines whether the portable electronic device is within the predefined percentage of the subset of portable electronic devices in accordance with the usage rate of a processor for a predefined number of successive cycles.

In accordance with a determination that the portable electronic device does not satisfy the performance criteria with respect to the multiple portable electronic devices, the portable electronic device selects (710) one of the multiple portable electronic devices as a new master device, and transfers (712) a master device status to the selected portable electronic device. For example, in some embodiments, the portable electronic device selects, among the multiple portable electronic devices, a portable electronic device that exceeds the threshold energy level and has a lowest usage rate of a processor.

In some embodiments, transferring the master device status to the selected portable electronic devices includes (714) sending, to portable electronic devices connected as slave devices to the portable electronic device, a broadcast message indicating that the selected portable electronic device is a new master device.

Subsequent to transferring a master device status to the selected portable electronic device, the portable electronic device communicates (716, FIG. 7B), as a slave device, with the selected portable electronic device.

In some embodiments, communicating, as a slave device, with the selected portable electronic device includes (718) sending one or more performance parameters of the portable electronic device to the selected portable electronic device. In some embodiments, the new master device receives one or more performance parameters from the portable electronic device (similar to operation 702 described above).

In some embodiments, in accordance with a determination that the portable electronic device satisfies the performance criteria with respect to the multiple portable electronic devices, the portable electronic device continues to operate as a master device.

In some embodiments, the portable electronic device receives (720) a resource request from a first slave device, and, in response to receiving the resource request, sending a broadcast message to one or more slave devices, connected to the portable electronic device as slave devices, other than the first slave device. The portable electronic device, in response to sending the broadcast message, receiving one or more responses from the one or more slave devices, selects a slave device in accordance with predefined criteria, and sends information identifying the selected slave device to the first slave device. For example, see operations described with respect to FIG. 3.

In some embodiments, selecting the slave device in accordance with the predefined criteria includes (722) selecting a subset of the one or more slave devices, connected to the portable electronic device as slave devices, that have a resource requested in the resource request, and, selecting a slave device, of the subset of the one or more slave devices, based on one or more performance parameters of the slave device. For example, in some embodiments, the portable electronic device selects a slave device that stores a requested file (which in some embodiments include a data file or a data packet) and has a lowest usage rate of a processor among the slave devices.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method for controlling game data communication between portable electronic devices, performed by a portable electronic device with memory and one or more processors, the method comprising:
    receiving one or more performance parameters from multiple portable electronic devices as slave devices, wherein the one or more performance parameters include one or more of an energy level of a respective portable electronic device and a usage rate of a processor of the respective portable electronic device;
    determining whether the portable electronic device satisfies performance criteria with respect to the multiple portable electronic devices, further including:
        identifying a subset of the multiple portable electronic devices that exceed a threshold energy level; and
        determining whether the portable electronic device is within a predefined percentage of the subset of portable electronic devices in accordance with the usage rate of a processor for a predefined number of successive cycles;
    in accordance with a determination that the portable electronic device does not satisfy the performance criteria with respect to the multiple portable electronic devices:
        selecting one of the multiple portable electronic devices as a new master device; and
        transferring a master device status to the selected portable electronic device; and,
    subsequent to transferring a master device status to the selected portable electronic device, communicating, as a slave device, with the selected portable electronic device.

2. The method of claim 1, wherein transferring the master device status to the selected portable electronic devices includes sending, to portable electronic devices connected as slave devices to the portable electronic device, a broadcast message indicating that the selected portable electronic device is a new master device.

3. The method of claim 1, wherein communicating, as a slave device, with the selected portable electronic device includes sending one or more performance parameters of the portable electronic device to the selected portable electronic device.

4. The method of claim 1, further comprising:
    receiving a resource request from a first slave device;
    in response to receiving the resource request, sending a broadcast message to one or more slave devices, connected to the portable electronic device as slave devices, other than the first slave device; and,
    in response to sending the broadcast message, receiving one or more responses from the one or more slave devices:
        selecting a slave device in accordance with predefined criteria; and
        sending information identifying the selected slave device to the first slave device.

5. The method of claim 4, wherein selecting the slave device in accordance with the predefined criteria includes:
    selecting a subset of the one or more slave devices, connected to the portable electronic device as slave devices, that have a resource requested in the resource request, and
    selecting a slave device, of the subset of the one or more slave devices, based on one or more performance parameters of the slave device.

6. A portable electronic device for controlling game data communication with portable electronic devices, comprising:
    one or more processors; and
    memory storing one or more programs for execution by the one or more processors, the one or more programs including instructions for:
        receiving one or more performance parameters from multiple portable electronic devices as slave devices, wherein the one or more performance parameters include one or more of an energy level of a respective portable electronic device and a usage rate of a processor of the respective portable electronic device;
        determining whether the portable electronic device satisfies performance criteria with respect to the multiple portable electronic devices, further including:
            identifying a subset of the multiple portable electronic devices that exceed a threshold energy level; and
            determining whether the portable electronic device is within a predefined percentage of the subset of portable electronic devices in accordance with the usage rate of a processor for a predefined number of successive cycles;
        in accordance with a determination that the portable electronic device does not satisfy the performance criteria with respect to the multiple portable electronic devices:
            selecting one of the multiple portable electronic devices as a new master device; and
            transferring a master device status to the selected portable electronic device; and,
        subsequent to transferring a master device status to the selected portable electronic device, communicating, as a slave device, with the selected portable electronic device.

7. The portable electronic device of claim 6, wherein transferring the master device status to the selected portable electronic devices includes sending, to portable electronic devices connected as slave devices to the portable electronic device, a broadcast message indicating that the selected portable electronic device is a new master device.

8. The portable electronic device of claim 6, wherein communicating, as a slave device, with the selected portable electronic device includes sending one or more performance parameters of the portable electronic device to the selected portable electronic device.

9. The portable electronic device of claim 6, wherein the one or more programs include instructions for:
receiving a resource request from a first slave device;
in response to receiving the resource request, sending a broadcast message to one or more slave devices, connected to the portable electronic device as slave devices, other than the first slave device; and,
in response to sending the broadcast message, receiving one or more responses from the one or more slave devices:
selecting a slave device in accordance with predefined criteria; and
sending information identifying the selected slave device to the first slave device.

10. The portable electronic device of claim 9, wherein selecting the slave device in accordance with the predefined criteria includes:
selecting a subset of the one or more slave devices, connected to the portable electronic device as slave devices, that have a resource requested in the resource request, and,
selecting a slave device, of the subset of the one or more slave devices, based on one or more performance parameters of the slave device.

11. A non-transitory computer readable storage medium storing one or more programs for execution by one or more processors of a portable electronic device, the one or more programs including instructions for:
receiving one or more performance parameters from multiple portable electronic devices as slave devices, wherein the one or more performance parameters include one or more of an energy level of a respective portable electronic device and a usage rate of a processor of the respective portable electronic device;
determining whether the portable electronic device satisfies performance criteria with respect to the multiple portable electronic devices, further including:
identifying a subset of the multiple portable electronic devices that exceed a threshold energy level; and
determining whether the portable electronic device is within a predefined percentage of the subset of portable electronic devices in accordance with the usage rate of a processor for a predefined number of successive cycles;
in accordance with a determination that the portable electronic device does not satisfy the performance criteria with respect to the multiple portable electronic devices:
selecting one of the multiple portable electronic devices as a new master device; and
transferring a master device status to the selected portable electronic device; and,
subsequent to transferring a master device status to the selected portable electronic device, communicating, as a slave device, with the selected portable electronic device.

12. The computer readable storage medium of claim 11, wherein transferring the master device status to the selected portable electronic devices includes sending, to portable electronic devices connected as slave devices to the portable electronic device, a broadcast message indicating that the selected portable electronic device is a new master device.

13. The computer readable storage medium of claim 11, wherein communicating, as a slave device, with the selected portable electronic device includes sending one or more performance parameters of the portable electronic device to the selected portable electronic device.

14. The computer readable storage medium of claim 11, wherein the one or more programs include instructions for:
receiving a resource request from a first slave device;
in response to receiving the resource request, sending a broadcast message to one or more slave devices, connected to the portable electronic device as slave devices, other than the first slave device; and,
in response to sending the broadcast message, receiving one or more responses from the one or more slave devices:
selecting a slave device in accordance with predefined criteria; and
sending information identifying the selected slave device to the first slave device.

* * * * *